United States Patent
Park

(10) Patent No.: US 11,244,415 B2
(45) Date of Patent: Feb. 8, 2022

(54) PERSONAL IP PROTECTION SYSTEM AND METHOD

(71) Applicant: EZ-Trust Co., Ltd., Seoul (KR)

(72) Inventor: Jaeyong Park, Hwaseong-si (KR)

(73) Assignee: EZ-Trust Co., Ltd., Seoul (KR)

( * ) Notice: Subject to any disclaimer, the term of this patent is extended or adjusted under 35 U.S.C. 154(b) by 0 days.

(21) Appl. No.: 17/369,343

(22) Filed: Jul. 7, 2021

(65) Prior Publication Data

US 2022/0012833 A1 Jan. 13, 2022

(30) Foreign Application Priority Data

Jul. 7, 2020 (KR) .................. 10-2020-0083700

(51) Int. Cl.
| | |
|---|---|
| *G06Q 50/18* | (2012.01) |
| *G06F 21/60* | (2013.01) |
| *H04L 29/06* | (2006.01) |
| *H04L 9/06* | (2006.01) |
| *G06Q 30/00* | (2012.01) |
| *G06Q 10/10* | (2012.01) |
| *G06F 16/951* | (2019.01) |
| *H04L 9/08* | (2006.01) |

(52) U.S. Cl.
CPC ......... *G06Q 50/184* (2013.01); *G06F 16/951* (2019.01); *G06F 21/602* (2013.01); *G06Q 10/10* (2013.01); *G06Q 30/018* (2013.01); *H04L 9/0643* (2013.01); *H04L 9/0869* (2013.01); *H04L 63/0428* (2013.01); *G06Q 2220/18* (2013.01); *H04L 2209/38* (2013.01)

(58) Field of Classification Search
CPC .... G06Q 50/184; G06Q 10/10; G06Q 30/018; G06F 16/951; G06F 21/602; H04L 9/0643; H04L 9/0869; H04L 63/0428
See application file for complete search history.

(56) References Cited

U.S. PATENT DOCUMENTS

| | | | | |
|---|---|---|---|---|
| 10,509,891 | B2* | 12/2019 | Solow | ............... G06F 21/645 |
| 10,513,077 | B2* | 12/2019 | Mattingly | ............. B29C 64/386 |
| 11,004,072 | B2* | 5/2021 | Georgiadis | ............ H04L 9/3271 |
| 2016/0055490 | A1* | 2/2016 | Keren | .................. G06Q 30/00 |
| | | | | 705/14.47 |
| 2017/0006054 | A1* | 1/2017 | Stiansen | ............. H04L 63/1425 |

(Continued)

FOREIGN PATENT DOCUMENTS

| | | |
|---|---|---|
| KR | 10-2018-0138217 A | 12/2018 |
| KR | 10-2019-0055371 A | 5/2019 |

(Continued)

OTHER PUBLICATIONS

Filip "The Blockchain technology and its application in the protection of intellectual property, Diploma Thesis, 2019, 62 pages" (Year: 2019).*

(Continued)

*Primary Examiner* — Oleg Korsak

(74) *Attorney, Agent, or Firm* — Sughrue Mion, PLLC

(57) ABSTRACT

Disclosed are a personal intellectual property (IP) protection system and method. That is, according to the present invention, when writing a contract between individuals online, by providing a smart contract function based on a blockchain, transactions between individuals are safely conducted while protecting personal information.

9 Claims, 2 Drawing Sheets

(56) References Cited

U.S. PATENT DOCUMENTS

| | | | | |
|---|---|---|---|---|
| 2018/0181904 A1* | 6/2018 | Wilkinson | ............ | G06Q 10/083 |
| 2018/0247078 A1* | 8/2018 | Newman | ................. | G06F 16/93 |
| 2018/0285996 A1* | 10/2018 | Ma | ...................... | G06F 16/2428 |
| 2018/0349879 A1* | 12/2018 | High | .................... | G06Q 20/389 |
| 2019/0005595 A1* | 1/2019 | Tautenhan | ............ | H04L 9/3236 |
| 2019/0114395 A1* | 4/2019 | Lenchner | ................ | G06F 21/10 |
| 2019/0325115 A1* | 10/2019 | Wilkinson | .............. | G06F 21/64 |
| 2020/0380090 A1* | 12/2020 | Marion | ................. | H04L 9/3239 |

FOREIGN PATENT DOCUMENTS

| | | |
|---|---|---|
| KR | 10-2023101 B1 | 11/2019 |
| KR | 10-2019-0134432 A | 12/2019 |
| KR | 10-2020-0012321 A | 2/2020 |
| KR | 10-2020-0021900 A | 3/2020 |

OTHER PUBLICATIONS

Korean Office Action for KR 10-2020-0083700 dated Oct. 19, 2020.
Korean Notice of Allowance for KR 10-2020-0083700 dated Jan. 11, 2021.

* cited by examiner

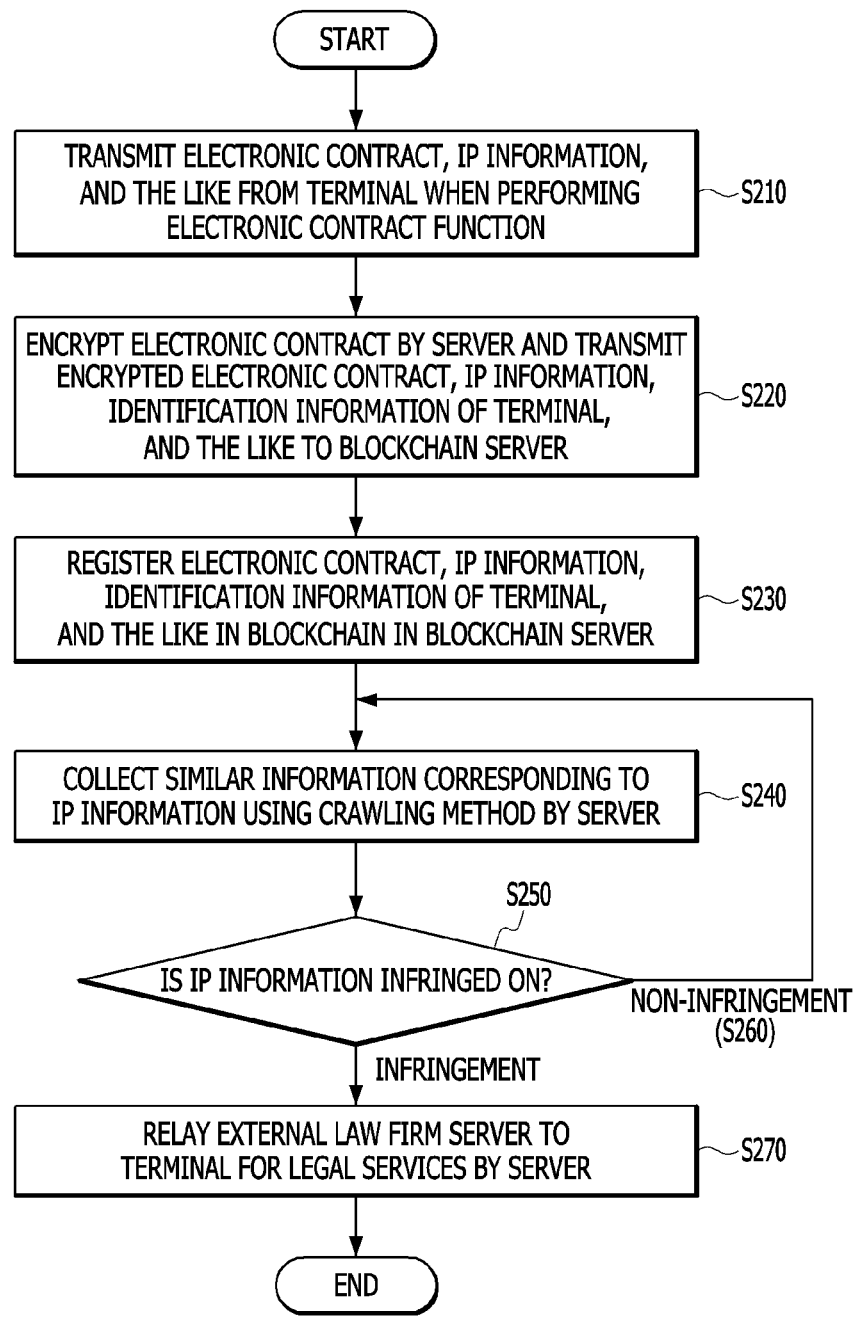

PERSONAL IP PROTECTION SYSTEM AND METHOD

CROSS-REFERENCE TO RELATED APPLICATION

This application claims priority to and the benefit of Korean Patent Application No. 10-2020-0083700, filed on Jul. 7, 2020, the disclosure of which is incorporated herein by reference in its entirety.

BACKGROUND

1. Field of the Invention

The present invention relates to a personal intellectual property (IP) protection system and method, and more particularly, to a personal IP protection system and method for providing a smart contract function based on a blockchain when writing a contract between individuals online.

2. Discussion of Related Art

An electronic contract has the same concept as that of the conventional contract, but a method thereof is different from that of the conventional contract in that the electronic contract is made through an electronic document. That is, as a formal force (the documentary nature of a data message) of the electronic document is acknowledged, a contract based on a data message will also have legal force. In this way, when the documentary nature of the data message is acknowledged, there may be issues such as request and acceptance related to a time of contract formation, a place of contract formation, reliability and safety of a data message related to contract performance, and the like. In Korea, laws and regulations on the above issues are based on the Civil Act, the Commercial Act, the Electronic Transaction Framework Act, and the like.

In addition, intellectual property (IP) rights are rights granted by laws to intellectual creations of humans.

In the case of the IP rights owned by individuals, even when the IP rights are illegally used and distributed online, it is difficult to collect evidence of illegal use and distribution and determine whether IP is being infringed on, and thus damage to rights infringement is increasing because electronic contracts are not applied.

DOCUMENT OF RELATED ART

Patent Document (Patent Document 0001) Korean Laid-open Patent Application No. 10-2020-0064663 [Title: Blockchain-Based Smart Electronic Contract Signing Method and System]

SUMMARY OF THE INVENTION

The present invention is directed to providing a personal intellectual property (IP) protection system and method for providing a smart contract function based on a blockchain when writing a contract between individuals online.

The present invention is also directed to providing a personal IP protection system and method for collecting similar information related to personal IP registered in a server using a web crawling method, etc. and determining whether a corresponding personal IP is infringed on by comparing the collected similar information to the personal IP.

According to an aspect of the present invention, there is provided a personal IP protection system including a terminal configured to transmit, when the terminal performs an electronic contract function with another terminal for IP to which a user of the terminal has a right, an electronic contract generated in relation to electronic contract, IP information related to the generated electronic contract, and identification information of the terminal, a server configured to encrypt the electronic contract using a preset personal key and transmit the encrypted electronic contract, the IP information related to the electronic contract, and the identification information of the terminal to a blockchain server, and the blockchain server configured to register the encrypted electronic contract, the IP information related to the electronic contract, and the identification information of the terminal, which are transmitted from the server, in a blockchain in the blockchain server.

The IP information may include at least one of a type of IP rights corresponding to the IP, file information related to the IP rights, a date of registration of the rights, and a name of a person having the rights.

The blockchain server may register the encrypted electronic contract, the IP information related to the electronic contract, and the identification information of the terminal as a key value of a block related to the electronic contract in a blockchain.

The server may collect one or more pieces of similar information corresponding to the IP information from among a plurality of contents stored in a plurality of content management servers on the basis of the IP information using a crawling method and compare the IP information to the collected similar information to determine whether the collected similar information infringes on the IP information.

As a result of the determination, when it is determined that the collected similar information infringes on the IP information, the server may relay the terminal and an external law firm server so that the terminal performs a legal service for IP information infringement.

According to another aspect of the present invention, there is provided a personal IP protection method including when a terminal performs an electronic contract function with another terminal for IP to which a user of the terminal has a right, transmitting, by the terminal, an electronic contract generated in relation to electronic contract, IP information related to the generated electronic contract, and identification information of the terminal to a server, encrypting, by the server, the electronic contract using a preset personal key, transmitting, by the server, the encrypted electronic contract, the IP information related to the electronic contract, and the identification information of the terminal to a blockchain server, and registering, by the blockchain server, the encrypted electronic contract, the IP information related to the electronic contract, and the identification information of the terminal, which are transmitted from the server, in a blockchain in the blockchain server.

The encrypting of the electronic contract using the preset personal key may include generating a random number code having a preset number of bits, generating a hash value by applying the generated random number code to a preset hash function, extracting a preset bit section from the generated hash value, generating a personal key and an encryption key including a public key by applying the extracted bit section to another preset hash function, and encrypting the electronic contract using the generated personal key.

The encrypting of the electronic contract using the preset personal key may include identifying data not to be disclosed and data to be disclosed of the electronic contract, encrypting the identified data not to be disclosed using a preset encryption method and generating encrypted data, and generating a partially encrypted electronic contract including the generated encrypted data and the identified data to be disclosed.

The registering in the blockchain in the blockchain server may include registering the encrypted electronic contract, the IP information related to the electronic contract, and the identification information of the terminal as a key value of a block related to the electronic contract in the blockchain.

The personal IP protection method may further include collecting, by the server, one or more pieces of similar information corresponding to the IP information from among a plurality of contents stored in a plurality of content management servers on the basis of the IP information using a crawling method, comparing, by the server, the IP information to the collected similar information and determining whether the collected similar information infringes on the IP information, and as a result of the determination, when it is determined that the collected similar information infringes on the IP information, determining, by the server, that the collected similar information infringes on the IP information and relaying the terminal and an external law firm server so that the terminal performs a legal service for IP information infringement.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2 is a flowchart illustrating a personal IP protection method according to an embodiment of the present invention.

DETAILED DESCRIPTION OF EXEMPLARY EMBODIMENTS

Figure 1:
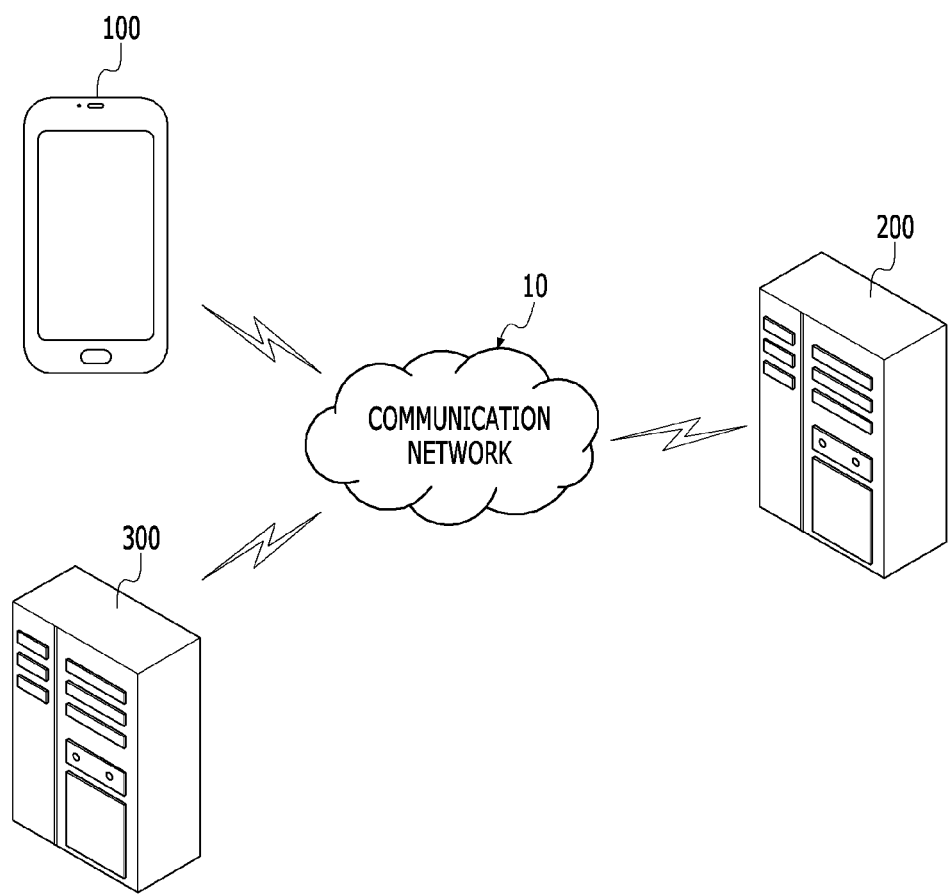
FIG. 1 is a block diagram illustrating a configuration of a personal intellectual property (IP) protection system according to an embodiment of the present invention.

It should be noted that technical terms used in the present invention are only used for describing specific embodiments and are not intended to limit the present invention. In addition, unless otherwise defined in the present invention, the technical terms used in the present invention should be interpreted as having the same meaning as commonly understood by those of skilled in the art to which the present invention belongs and should not be interpreted in an overly comprehensive sense or in an overly narrow sense. Further, when the technical terms used in the present invention are incorrect technical terms that do not accurately express the spirit of the present invention, it should be understood that the technical terms herein may be replaced with technical terms that can be correctly understood by those skilled in the art. Further, general terms used in the present invention should be interpreted as defined in the dictionary or according to the context before and after and should not be interpreted in an excessively reduced meaning.

Further, as used herein, the singular forms "a" and "an" are intended to include the plural forms as well, unless the context clearly indicates otherwise. The terms "comprise," "comprising," "include," and/or "including," when used herein, should not be construed as necessarily including all of various elements or various steps described in the present invention, and it should be construed that some elements or some steps thereof may not be included or additional elements or operations may be further included.

Further, it will be understood that, although the terms "first," "second," etc. may be used herein to describe various elements, these elements should not be limited by these terms. These terms are only used to distinguish one element from another element. For example, a first element may be referred to as a second element, and similarly, a second element may be referred to as a first element without departing from the scope of the present invention.

Hereinafter, exemplary embodiments of the present invention will be described in detail with reference to the accompanying drawings. The same or similar elements are denoted by the same or similar reference numerals regardless of reference numbers, and descriptions thereof will not be repeated.

Further, in the description of the present invention, when it is determined that detailed descriptions of known technology related to the present invention unnecessarily obscure the subject matter of the present invention, detailed descriptions thereof will be omitted. Further, it should be noted that the accompanying drawings are only examples to facilitate overall understanding of the spirit of the present invention and the spirit of the present invention should not be construed as being limited by the accompanying drawings.

FIG. 1 is a block diagram illustrating a configuration of a personal intellectual property (IP) protection system 10 according to an embodiment of the present invention.

As illustrated in FIG. 1, the personal IP protection system 10 includes a terminal 100, a server 200, and a blockchain server 300. Not all of the components of the personal IP protection system 10 illustrated in FIG. 1 are essential components, and the personal IP protection system 10 may be implemented with more components than the components illustrated in FIG. 1 or may be implemented with fewer components.

The terminal 100 may be applied to various terminals such as smartphones, portable terminals, mobile terminals, foldable terminals, personal digital assistants (PDAs), portable multimedia player (PMP) terminals, telematics terminals, navigation terminals, personal computers (PCs), notebook computers, slate PCs, tablet PCs, Ultrabook computers, wearable devices (e.g., smartwatches, smart glasses, head mounted displays (HMDs), etc.), WiBro terminals, Internet Protocol television (IPTV) terminals, smart TVs, digital broadcasting terminals, audio-visual navigation (AVN) terminals, audio/video (A/V) systems, flexible terminals, digital signage devices, and the like.

Each of the terminal 100, the server 200, and the blockchain server 300 may include a communication unit (not illustrated) for performing a communication function with other terminals, a storage unit (not illustrated) for storing various pieces of information and programs (or applications), a display unit (not illustrated) for displaying various pieces of information and program execution results, an audio output unit (not illustrated) for outputting audio information corresponding to execution results of the various pieces of information and program, a control unit (not illustrated) for controlling various components and functions of each terminal, and the like.

The terminal 100 communicates with the server 200, the blockchain server 300, and the like. In this case, the terminal 100 may be a terminal owned by a user who subscribes to the server 200 and wants to use a service such as an IP protection function or the like provided by the server 200.

Further, the terminal 100 interworks with the server 200 and causes the user to subscribe as a user for using an electronic contract writing function, an IP infringement checking function, a history management function, and the like through a dedicated app and/or a website provided by the server 200, and the terminal 100 registers personal information and the like in the server 200. In this case, the personal information includes an identification (ID), an email address, a password, a name, a gender, a date of birth, a contact number, an address, and the like.

Further, the terminal 100 may cause the user to subscribe as a user to the server 200 using account information of a social networking service (SNS) or mobile messenger to which the user of the corresponding terminal 100 subscribes. Here, the account information of the SNS may be information related to Facebook, Twitter, KakaoStory, Naver, PAYCO, and the like. Further, the account information of the mobile messenger may be information related to KakaoTalk, Line, Viber, WeChat, WhatsApp, Telegram, Snapchat, and the like. In this case, the server 200 may provide different user interfaces (UIs) to a user who wants to use an electronic contract writing function, an IP infringement checking function, a history management function, and the like and to an administrator who wants to provide a management function and the like.

Further, when the terminal 100 performs a subscription procedure, the terminal 100 may normally complete the subscription procedure for the server 200 only after completing an authentication function through an identity authentication means (e.g., mobile phone, credit card, i-Pin, etc.).

Further, after the subscription is completed, a dedicated app (or application/application program/specific app) provided by the server 200 is installed in the corresponding terminal 100 in order to use a service provided by the server 200. In this case, the dedicated app may be an app for performing an electronic contract writing function, an IP infringement checking function, a history management function, and the like.

Further, in the terminal 100, when an electronic contract with another terminal (not illustrated) is written (or when an electronic contract function with another terminal is performed in the terminal 100), the terminal 100 generates an electronic contract (or an electronic contract file) related to electronic contract.

That is, in relation to IP owned by the user of the terminal 100, when a user of another terminal writes (or performs an electronic contract function) an electronic contract including contract details related to the use of the corresponding IP, the terminal 100 generates an electronic contract related to the IP using a pre-stored (or preset) electronic contract form. Here, the IP (or IP rights) includes images, moving pictures (or videos), text, etc. to which the user of the corresponding terminal 100 has a right.

Further, the terminal 100 transmits IP information related to the generated electronic contract, the generated electronic contract (or the electronic contract file), ID information of the terminal 100, and the like to the server 200. Here, the IP information includes a type of IP rights corresponding to the corresponding IP, file information related to the IP rights, a date of registration of rights, a name of a person having rights, and the like. Further, the ID information of the terminal 100 includes a mobile directory number (MDN), a mobile Internet Protocol (IP) address, a mobile media access control (MAC) address, subscriber identity module (SIM) card unique information, a serial number, and the like.

Further, in the terminal 100 (or the another terminal), when the user wants to check information about a specific block registered in the blockchain server 300, the terminal 100 (or the another terminal) transmits block provision request information for requesting transmission of a specific block among a plurality of blocks registered in the blockchain server 300, the ID information of the terminal 100 (or the another terminal), and the like to the blockchain server 300. Here, the block provision request information (or a block provision request signal) includes information about the specific block to be checked by the corresponding terminal 100 or the another terminal.

Further, the terminal 100 (or the another terminal) receives the specific block transmitted from the blockchain server 300 in response to the previously transmitted block provision request information.

Further, the terminal 100 (or the another terminal) decrypts the received specific block using a preset decryption method and outputs the decrypted information (or data).

That is, the terminal 100 (or the another terminal) decrypts the received specific block using a personal key (or a public key) and outputs the decrypted information. Here, the personal key (or a private key) may be connected to authentication information (or personal information) of the user which corresponds to the ID information of the corresponding terminal 100 or may be in a state of being generated based on the authentication information of the corresponding user.

In this case, when the information related to the specific block is composed of data not to be disclosed and data to be disclosed, the terminal 100 (or the another terminal) may decrypt the data not to be disclosed, which is encrypted using the preset decryption method, and output the decrypted data not to be disclosed and the data to be disclosed together.

That is, when the terminal 100 (or the another terminal) does not possess a public key or a personal key for decryption in relation to the received specific block, the terminal 100 (or the another terminal) displays the content of the data to be disclosed, which is set as public information, among the information included in the received specific block. In this case, the terminal 100 (or the another terminal) may not be able to check (or output) the content of data encrypted by the corresponding personal key, which is set as private information, among the information included in the received specific block.

Further, when the terminal 100 (or the another terminal) possesses the public key or the personal key is possessed in relation to the received specific block, the terminal 100 (or the another terminal) decrypts data encrypted using the personal key, which is set as the private information, among the information included in the received specific block using the public key and displays the decrypted private information (or decrypted data not to be disclosed) and the content of the data to be disclosed, which is set as the public information, among the received specific block together.

Further, as a result of monitoring whether there is information that infringes on the IP information with respect to a plurality of pieces of information registered in a plurality of content management servers (not illustrated) on the basis of the IP information provided by the terminal 100 in the server 200, when it is confirmed that there is similar information that infringes on the IP information, the terminal 100 performs legal services (or legal consultation services) such as sending a warning letter according to IP information infringement and reviewing infringement lawsuits with an external law firm server (not illustrated) (or the user of the terminal 100 and a person in charge/lawyer/judicial scrivener of an external law firm) through the server 200.

Further, in the embodiment of the present invention, the electronic contract writing function, the IP infringement checking function, the history management function, and the like are described as being performed through the dedicated app provided from the server 200, but the present invention is not limited thereto, and the electronic contract writing function, the IP infringement checking function, the history management function, and the like may be performed through a website (or a web page) provided by the server 200 in addition to the dedicated app.

The server 200 communicates with the terminal 100, the blockchain server 300, and the like.

Further, the server 200 performs a subscription procedure for the user of the terminal 100 or the like.

Further, the server 200 registers personal information related to the user of the terminal 100 or the like. In this case, the server 200 may register (or manage) the corresponding personal information and the like in a database (DB) server (not illustrated).

Further, the server 200 performs a member management function for the user of the terminal 100 or the like.

Further, the server 200 provides a dedicated app and/or website, which provides an electronic contract writing function, an IP infringement checking function, a history management function, and the like, to the terminal 100 or the like. In this case, the dedicated app may provide different UIs to a user who wants to use an electronic contract writing function, an IP infringement checking function, a history management function, and the like and to an administrator who performs a management function, a value evaluation function, and the like.

Further, the server 200 provides a bulletin board function for announcements, events, and the like.

Further, the server 200 receives IP information related to the electronic contract, the electronic contract (or the electronic contract file), the ID information of the terminal 100, and the like, which are transmitted from the terminal 100. Here, the IP information includes a type of IP rights corresponding to the corresponding IP, file information related to the IP rights, a date of registration of rights, a name of a person having rights, and the like.

Further, the server 200 encrypts the received electronic contract (or the electronic contract file) using a preset personal key and stores the encrypted electronic contract. In this case, in order to collect and provide better evidence in case of a dispute, the server 200 manages (or keeps/stores) registration and publication of the corresponding IP (or work/content) and all procedures and histories of the registration and publication. Here, the personal key (or private key) may be connected to the authentication information (or personal information) of the user, which corresponds to the ID information of the corresponding terminal 100, and may be in a state of being generated based on the authentication information of the corresponding user or in a state of being generated using a random number code and a hash function.

As described above, the server 200 may provide (or perform) a history management function for the electronic contract (or the electronic contract file), the ID information of the terminal 100, and the like which are transmitted from the terminal 100.

Further, when history management list inquiry request information related to the corresponding electronic contract and/or the IP information is transmitted from the terminal 100, the server 200 may provide history management information and/or the IP information related to the corresponding electronic contract to the corresponding terminal 100.

Further, the server 200 transmits the encrypted electronic contract (or encrypted electronic contract file), the IP information related to the electronic contract, the ID information of the terminal 100, and the like to the blockchain server 300.

In this case, the server 200 generates a random number code having a preset number of bits (e.g., a length of 128 bits to 512 bits) and generates a hash value by applying the generated random number code to a preset hash function.

Further, the server 200 extracts a preset bit section from the generated hash value and generates a personal key and a symmetric/asymmetric encryption key including a public key by applying the extracted bit section to another preset hash function. Here, the server 200 may generate the symmetric/asymmetric encryption key by applying the previously generated random number code to the hash function or the another hash function.

Further, the server 200 encrypts the received electronic contract (or the generated electronic contract file) using the generated personal key.

Further, the server 200 may transmit the encrypted electronic contract (or the encrypted electronic contract file), the IP information related to the electronic contract, the ID information of the terminal 100, and the like to the blockchain server 300.

Further, the server 200 identifies (or classifies) data not to be disclosed (or content/area) and data to be disclosed (or public data) from among the received electronic contract. Here, the data not to be disclosed (or private data) includes contract conditions, a resident registration number, address information, a phone number, and the like included in the electronic contract.

Further, the server 200 encrypts the identified (or classified) data not to be disclosed using a preset encryption method or the personal key to generate encrypted data. Here, the encryption method may include an Advanced Encryption Standard (AES) method and the like, and various known methods such as a symmetric encryption method, an asymmetric encryption method, and the like may be used.

Further, the server 200 stores (or manages) a partially encrypted electronic contract including the generated encrypted data and the identified (or classified) data (or public data) to be disclosed.

Further, the server 200 may transmit the generated partially encrypted electronic contract (or the generated encrypted data (or the generated encrypted private data) and the partially encrypted electronic contract including the identified public data), the IP information related to the electronic contract, the ID information of the terminal 100, and the like to the blockchain server 300.

Further, the server 200 collects one or more pieces of similar information corresponding to the IP information from among a plurality of contents stored in a plurality of content management servers (not illustrated) on the basis of the received IP information (or IP information related to the corresponding electronic contract) using a crawling method or the like. In this case, the similar information (or similar content) corresponds to an image, a moving picture, text, etc. included in the IP information and includes text (or posts registered in the content management server), images (e.g., png, gif, jpg, etc. form/format), moving pictures (e.g., asf, avi, mpeg, wmv, etc. form/format), upload date and time information of the similar information, link information where the corresponding similar information is posted, link information of the images/moving pictures included in the corresponding similar information for providing thumbnail information, the number of followers/subscribers of a posting account ID, the number of likes/dislikes/shares of posts of the corresponding similar information, contents of comments on posts of the corresponding similar information, posting hashtags related to the corresponding similar information for sorting similar information, and the like.

Further, the server 200 may perform pre-processing on the collected similar information. In this case, the pre-processing includes a cleaning process or the like. Here, the cleaning process (or de-noising process) may be a process of removing noise content (or noise data) corresponding to preset noise from the collected one or more pieces of similar information.

Further, the server 200 may compare the received IP information to the collected similar information and determine (or check) whether the collected similar information infringes on the corresponding IP information.

That is, the server 200 may determine whether the IP information corresponding to the collected similar information is in the same state as the received IP information (or a state of having a similarity greater than or equal to a preset reference value).

As a result of determination (or checking), when it is determined that the collected similar information does not infringe on the corresponding IP information, the server 200 confirms that the corresponding collected similar information does not infringe on the IP information, and the server 200 collects one or more pieces of similar information related to the IP information every preset period or according to a request of the terminal 100 or according to the control of an administrator who manages the server 200 and repeatedly performs the process of determining whether the IP information is infringed upon on the collected one or more pieces of similar information.

That is, as the result of determination (or checking), when it is determined that the IP information corresponding to the collected similar information is not the same state as the received IP information (or in a state of having a similarity less than the preset reference value and/or in a state where a similarity between the similar information and the IP information is less than the reference value), the server 200 confirms that the corresponding collected similar information does not infringe on the IP information.

Further, as a result of determination (or checking), when it is determined that the collected similar information infringes on the corresponding IP information, the server 200 confirms that the corresponding collected similar information infringes on the IP information, and the server 200 performs a function of relaying the terminal 100 and an external law firm server (not illustrated) (or the user of the terminal 100 and a person in charge/lawyer/judicial scrivener of an external law firm).

That is, as the result of determination (or checking), when it is determined that the IP information corresponding to the collected similar information is in the same state as the received IP information (or in a state of having a similarity greater than or equal to a preset reference value and/or in a state where a similarity between the similar information and the IP information is greater than or equal to the reference value), the server 200 confirms that the corresponding collected similar information infringes on the IP information, and the server 200 performs the function of relaying the terminal 100 and the external law firm server.

Further, the server 200 interworks with the blockchain server 300 to map the similar information that is determined to infringe on the IP information to the electronic contract and stores the pieces of information in a blockchain distributed ledger of the blockchain server 300 (or registers as a transaction on a blockchain network). In this case, the server 200 may encrypt the pieces of information using a preset encryption method (e.g., a public key encryption method, a private key encryption method, etc.) and store the pieces of encrypted information in the blockchain distributed ledger.

Further, the server 200 encrypts and stores all pieces of data of a platform provided by the server 200, and the scope of encryption is also included in transmission and reception of data.

Further, all network sections through which the data is transmitted may be encrypted and may be decrypted and used in a final step in which the data will be used.

Further, for safety of the data, a malicious code blocking program may be activated from an information input stage and, in order to prevent a keyboard security module and source leakage, an obfuscation solution may be applied and information leakage may be prevented.

Further, various types of data allow only authorized users to access information, monitor hacking threats for 24 hours a day, and take action immediately upon discovery.

As described above, the user of the terminal 100 may publish a work (or content/IP) produced by the user, post a license agreement for the work through the server 200 so that anyone may easily check who has the copyright for the work on the web, and directly proceed with the license agreement in the form of an electronic contract if he or she wants.

Further, since the server 200 manages a DB including originals, the server 200 may perform consulting, evidence collection, provision of collected evidence, etc. so that the user may search for an infringement case and a related lawsuit may proceed smoothly.

Further, the server 200 may provide a bulletin board (not illustrated) where anyone may freely browse the work generated by the user of the terminal 100, and the corresponding user (or copyright holder) may strengthen a substantive claim to copyright by publishing his/her own work.

The blockchain server 300 communicates with the terminal 100, the server 200, and the like.

Further, the blockchain server 300 receives the encrypted electronic contract (or encrypted electronic contract file), the IP information related to the electronic contract, the ID information of the terminal 100, and the like, which are transmitted from the server 200.

Further, the blockchain server 300 registers (or stores) the received encrypted electronic contract (or the encrypted electronic contract file), the IP information related to the electronic contract, the ID information of the terminal 100, and the like in a blockchain in the corresponding blockchain server 300. In this case, the blockchain server 300 registers (or stores) the received encrypted electronic contract (or encrypted electronic contract file), the IP information related to the electronic contract, the ID information of the terminal 100, and the like in the blockchain as a key value of a block related to the corresponding electronic contract (or encrypted electronic contract).

That is, the blockchain server 300 registers the received encrypted electronic contract (or encrypted electronic contract file), the IP information related to the electronic contract, the ID information of the terminal 100, and the like as the key value (or the key value of the block related to the encrypted electronic contract) of the block related to the corresponding electronic contract (or the electronic contract file) as a transaction in a blockchain network. In this case, the data of the corresponding block may be in a state of being encrypted using a preset encryption method according to data to be stored to check for forgery and falsification of an electronic document.

The blockchain is a concept of a de-centralized DB. That is, the blockchain may provide transparency, fairness, and reliability of the entire system because transactions are transmitted and verified only by agreement between all nodes participating in the network without any one entity taking over the system.

In the blockchain network, when a transaction is recorded once, all distributed nodes preserve pieces of block data, and thus the record of the transaction is not erased unless all nodes of the network are shut down at once and completely discarded.

In this case, when the blockchain server 300 receives a partially encrypted electronic contract including the encrypted data and the public data, the IP information related to the electronic contract, the ID information of the terminal 100, and the like, which are transmitted from the server 200, the blockchain server 300 may register (or store) the received partially encrypted electronic contract, the IP information related to the electronic contract, the ID information of the terminal 100, and the like as the key value of the block related to the corresponding electronic contract in the blockchain.

Further, the key may be managed using a hardware secure module (HSM). In this case, the key policy may be defined in the form of JavaScript Object Notation (JSON).

Further, the blockchain server 300 receives the block provision request information, the ID information of the terminal 100 (or the another terminal), and the like, which are transmitted from the terminal 100 (or the another terminal).

Further, the blockchain server 300 searches for (or confirms/extracts) the block corresponding to the corresponding block provision request information from among a plurality of blocks (or a plurality of blockchains) stored (or registered) in the corresponding blockchain server 300, and the blockchain server 300 transmits a specific block (or specific data/information corresponding to the specific block) corresponding to the retrieved (or confirmed/extracted) corresponding block provision request information to the terminal 100 (or the another terminal). In this case, the blockchain server 300 may authenticate whether the corresponding terminal 100 (or the another terminal) has an access right to the corresponding specific block. As a result of the authentication, when it is authenticated that the corresponding terminal 100 (or the another terminal) has the access right to the corresponding specific block, the blockchain server 300 may transmit the corresponding specific block to the terminal 100 (or the another terminal).

Further, when at least one key value is selected from among a plurality of key values managed by the blockchain server 300 (or when a request for providing at least one key value is received), the blockchain server 300 may provide (or transmit) the selected (or requested) at least one key value (or information/data corresponding to the corresponding key value) to the terminal 100.

As described above, when generating a contract between individuals online, a smart contract function based on a blockchain may be provided.

Further, as described above, the similar information related to the personal IP registered in the server may be collected using a web crawling method, and whether the corresponding personal IP is infringed on may be determined by comparing the collected similar information to the personal IP.

Hereinafter, a personal IP protection method according to the present invention will be described in detail with reference to FIGS. 1 and 2.

FIG. 2 is a flowchart illustrating a personal IP protection method according to an embodiment of the present invention.

First, in a terminal 100, when an electronic contract with another terminal (not illustrated) is written (or when an electronic contract function with another terminal is performed in the terminal 100), the terminal 100 generates an electronic contract (or an electronic contract file) related to electronic contract.

That is, in relation to IP owned by the user of the terminal 100, when a user of the another terminal writes (or performs am electronic contract function) an electronic contract including contract details related to the use of the corresponding IP, the terminal 100 generates an electronic contract related to the IP using a pre-stored (or preset) electronic contract form. Here, the IP (or IP rights) includes images, moving pictures (or videos), text, etc. to which the user of the corresponding terminal 100 has a right.

Further, the terminal 100 transmits the IP information related to the generated electronic contract, the generated electronic contract (or the electronic contract file), the ID information of the terminal 100, and the like to a server 200. Here, the IP information includes a type of IP rights corresponding to the corresponding IP, file information related to the IP rights, a date of registration of rights, a name of a person having rights, and the like. Further, the ID information of the terminal 100 includes an MDN, a mobile IP address, a MAC address, SIM card unique information, a serial number, and the like.

As an example, in relation to a first image to which a user of a first terminal 100 has a right, when an electronic contract function related to the use of the corresponding first image with another terminal is performed, the first terminal generates a first electronic contract related to the first image using an electronic contract form pre-stored in the corresponding first terminal.

Further, the first terminal transmits information about the first image, the generated first electronic contract, ID information of the first terminal, and the like to the server 200.

As another example, in relation to an eleventh moving picture to which a user of a second terminal 100 has a right, when an electronic contract function related to the use of the corresponding eleventh moving picture with still another terminal (not illustrated) is performed, the second terminal generates an eleventh electronic contract related to the eleventh moving picture using an electronic contract form pre-stored in the corresponding second terminal.

Further, the second terminal transmits information about the eleventh moving picture, the generated eleventh electronic contract, ID information of the second terminal, and the like to the server 200 (S210).

Thereafter, the server 200 receives IP information related to the electronic contract, the electronic contract (or the electronic contract file), the ID information of the terminal 100, and the like, which are transmitted from the terminal 100. Here, the IP information includes a type of IP rights corresponding to the corresponding IP, file information related to the IP rights, a date of registration of rights, a name of a person having rights, and the like.

Further, the server 200 encrypts the received electronic contract (or the electronic contract file) using a preset personal key and stores the encrypted electronic contract. In this case, in order to collect and provide better evidence in case of a dispute, the server 200 manages (or keeps/stores) registration and publication of the corresponding IP (or work/content) and all procedures and histories of the registration and publication. Here, the personal key (or a private key) may be connected to authentication information (or the personal information) of the user, which corresponds to the ID information of the corresponding terminal 100, and may be in a state of being generated based on the authentication information of the corresponding user or in a state of being generated using a random number code and a hash function.

Further, the server 200 transmits the encrypted electronic contract (or encrypted electronic contract file), the IP information related to the electronic contract, the ID information of the terminal 100, and the like to a blockchain server 300.

In this case, the server 200 generates a random number code having a preset number of bits (e.g., a length of 128 bits to 512 bits) and generates a hash value by applying the generated random number code to a preset hash function.

Further, the server 200 extracts a preset bit section from the generated hash value and generates a personal key and a symmetric/asymmetric encryption key including a public key by applying the extracted bit section to another preset hash function. Here, the server 200 may generate the symmetric/asymmetric encryption key by applying the previously generated random number code to the hash function or the another hash function.

Further, the server 200 encrypts the received electronic contract (or the generated electronic contract file) using the generated personal key.

Further, the server 200 may transmit the encrypted electronic contract (or the encrypted electronic contract file), the IP information related to the electronic contract, the ID information of the terminal 100, and the like to the blockchain server 300.

Further, the server 200 identifies (or classifies) data not to be disclosed (or content/area) and data to be disclosed (or public data) from among the received electronic contract. Here, the data not to be disclosed (or private data) includes contract conditions, a resident registration number, address information, a phone number, and the like included in the electronic contract.

Further, the server 200 encrypts the identified (or classified) data not to be disclosed using a preset encryption method or the personal key to generate encrypted data. Here, the encryption method may include an AES method and the like, and various known methods such as a symmetric encryption method, an asymmetric encryption method, and the like may be used.

Further, the server 200 stores (or manages) a partially encrypted electronic contract including the generated encrypted data and the identified (or classified) data (or public data) to be disclosed.

Further, the server 200 may transmit the generated partially encrypted electronic contract (or the generated encrypted data (or the generated encrypted private data) and the partially encrypted electronic contract including the identified public data), the IP information related to the electronic contract, the ID information of the terminal 100, and the like to the blockchain server 300.

As an example, the server 200 receives the information about the first image, the first electronic contract, the ID information of the first terminal, and the like, which are transmitted from the first terminal.

Further, the server 200 encrypts the received first electronic contract using a first personal key stored in the corresponding server 200 in response to the received ID information of the first terminal, and stores the encrypted first electronic contract by mapping (or matching/interworking) the encrypted first electronic contract to the ID information of the corresponding first terminal.

Further, the server 200 transmits the encrypted first electronic contract, the information about the first image, the ID information of the first terminal, and the like to the blockchain server 300.

As another example, the server 200 receives the information about the eleventh moving picture, the eleventh electronic contract, the ID information of the second terminal, and the like which are transmitted from the second terminal.

Further, the server 200 generates a preset random number code of 256 bits and generates an eleventh hash value by applying the generated random number code to a preset eleventh hash function (e.g., SHA-256 (Secure Hash Algorithm 256)).

Further, the server 200 extracts a preset first bit section (e.g., a total of 8 bits from a $5^{th}$ bit to a $12^{th}$ bit) from the generated eleventh hash value and generates an eleventh personal key and an eleventh asymmetric encryption key including an eleventh public key by applying the extracted first bit section to the eleventh hash function (e.g., SHA-256).

Further, the server 200 encrypts the received eleventh electronic contract using the generated eleventh personal key and transmits the encrypted eleventh electronic contract, the information about the eleventh moving picture, the ID information of the second terminal, and the like to the blockchain server 300 (S220).

Thereafter, the blockchain server 300 receives the encrypted electronic contract (or encrypted electronic contract file), the IP information related to the electronic contract, the ID information of the terminal 100, and the like, which are transmitted from the server 200.

Further, the blockchain server 300 registers (or stores) the received encrypted electronic contract (or the encrypted electronic contract file), the IP information related to the electronic contract, the ID information of the terminal 100, and the like in the blockchain in the corresponding blockchain server 300. In this case, the blockchain server 300 registers (or stores) the received encrypted electronic contract (or encrypted electronic contract file), the IP information related to the electronic contract, the ID information of the terminal 100, and the like in the blockchain as a key value of a block related to the corresponding electronic contract (or encrypted electronic contract).

That is, the blockchain server 300 registers the received encrypted electronic contract (or encrypted electronic contract file), the IP information related to the electronic contract, the ID information of the terminal 100, and the like as the key value (or the key value of the block related to the encrypted electronic contract) of the block related to the corresponding electronic contract (or the electronic contract file) as a transaction in a blockchain network. In this case, data of the corresponding block may be in a state of being encrypted using a preset encryption method according to data to be stored to check for forgery and falsification of an electronic document.

In this case, when the blockchain server 300 receives a partially encrypted electronic contract including the encrypted data and the public data, the IP information related to the electronic contract, the ID information of the terminal 100, and the like which are transmitted from the server 200, the blockchain server 300 may register (or store) the received partially encrypted electronic contract, the IP information related to the electronic contract, the ID information of the terminal 100, and the like as the key value of the block related to the corresponding electronic contract in the blockchain.

As an example, the blockchain server 300 receives the encrypted first electronic contract, the information about the first image, the ID information of the first terminal, and the like, which are transmitted from the server 200.

Further, the blockchain server 300 registers the received encrypted first electronic contract, the information about the first image, the ID information of the first terminal, and the like as the first key value of the first block related to the corresponding first electronic contract as a transaction in a blockchain network.

As another example, the blockchain server 300 receives the encrypted eleventh electronic contract, the information about the eleventh moving picture, the ID information of the second terminal, and the like which are transmitted from the server 200.

Further, the blockchain server 300 distributes and stores the received encrypted first electronic contract, the information about the eleventh moving picture, the ID information of the first terminal, and the like as an eleventh key value of an eleventh block related to the corresponding eleventh electronic contract in the blockchain in the blockchain server 300 (S230).

Further, the server 200 collects one or more pieces of similar information corresponding to the IP information from among a plurality of contents stored in a plurality of content management servers (not illustrated) on the basis of the received IP information (or IP information related to the corresponding electronic contract) using a crawling method or the like. In this case, the similar information (or similar content) corresponds to an image, a moving picture, text, etc. included in the IP information and includes text (or posts registered in the content management server), images (e.g., png, gif, jpg, etc. form/format), moving pictures (e.g., asf, avi, mpeg, wmv, etc. form/format), upload date and time information of the similar information, link information where the corresponding similar information is posted, link information of the images/moving pictures included in the corresponding similar information for providing thumbnail information, the number of followers/subscribers of a posting account ID, the number of likes/dislikes/shares of posts of the corresponding similar information, contents of comments on posts of the corresponding similar information, posting hashtags related to the corresponding similar information for sorting similar information, and the like.

Further, the server 200 may perform pre-processing on the collected similar information. In this case, the pre-processing includes a cleaning process and the like. Here, the cleaning process (or de-noising process) may be a process of removing noise content (or noise data) corresponding to preset noise from the collected one or more pieces of similar information.

As an example, the server 200 interworks with a plurality of content management servers including a Naver server (not illustrated), a Daum server (not illustrated), a Google image search server (not illustrated), a YouTube server (not illustrated), an Instagram server (not illustrated), and the like on the basis of the information about the received first image, and the server 200 collects a first similar image to a third similar image corresponding to the first image from among a plurality of contents stored in the plurality of corresponding content management servers using a web crawling method (S240).

Further, the server 200 may compare the received IP information to the collected similar information and determine (or check) whether the collected similar information infringes on the corresponding IP information.

That is, the server 200 may determine whether the IP information corresponding to the collected similar information is in the same state as the received IP information (or a state of having a similarity greater than or equal to a preset reference value).

As an example, the server 200 calculates a first similarity between the first image and the collected first similar image, a second similarity between the first image and the collected second similar image, and a third similarity between the first image and the collected third similar image.

Further, the server 200 may determine whether the calculated first similarity to the third similarity are greater than or equal to a preset first reference value (e.g., 95%) (S250).

As a result of determination (or checking), when it is determined that the collected similar information does not infringe on the corresponding IP information, the server 200 confirms that the corresponding collected similar information does not infringe on the IP information, collects one or more pieces of similar information related to the IP information every preset period or according to a request of the terminal 100 or according to the control of an administrator who manages the server 200, and repeatedly performs the process of determining whether the IP information is infringed upon on the collected one or more pieces of similar information.

That is, as the result of determination (or checking), when it is determined that the IP information corresponding to the collected similar information is not the same state as the received IP information (or in a state of having a similarity less than the preset reference value and/or in a state where a similarity between the similar information and the IP information is less than the reference value), the server 200 confirms that the corresponding collected similar information does not infringe on the IP information.

As an example, when it is determined that the calculated first similarity to the second similarity is less than the preset first reference value (e.g., 95%), the server 200 confirms that the collected first similar image and the second similar image do not infringe on the corresponding first image (S260).

Further, as the result of determination (or checking), when it is determined that the collected similar information infringes on the corresponding IP information, the server 200 confirms that the corresponding collected similar information infringes on the IP information, and the server 200 performs a function of relaying the terminal 100 and an external law firm server (not illustrated) (or the user of the terminal 100 and a person in charge/lawyer judicial scrivener of an external law firm).

That is, as the result of determination (or checking), when it is determined that the IP information corresponding to the collected similar information is in the same state as the received IP information (or in a state of having a similarity greater than or equal to a preset reference value and/or in a state where a similarity between the similar information and the IP information is greater than or equal to the reference value), the server 200 confirms that the corresponding collected similar information infringes on the IP information, and the server 200 performs the function of relaying the terminal 100 and the external law firm server.

As an example, when it is determined that the calculated third similarity (e.g., 98%) is greater than or equal to the preset first reference value (e.g., 95%), the server 200 confirms that the collected third similar image infringes on the corresponding first image, and the server 200 performs a function of relaying the first terminal and the external law firm server so that the first terminal may perform a function of sending a warning letter (S270).

In the embodiments of the present invention, as described above, when writing a contract between individuals online, a smart contract function based on a blockchain may be provided so that a transaction between individuals may be safely performed while protecting personal information.

Further, in the embodiments of the present invention, as described above, the similar information related to the personal IP registered in the server may be collected using the web crawling method and the like, and whether the similar information infringes on the corresponding personal IP may be determined by comparing the collected similar information to the personal IP. When it is determined that the similar information infringes on the personal IP, the user of the terminal may be rapidly notified of the corresponding information, and thus the user may take an appropriate response to increase the user's satisfaction.

According to the present invention, when writing a contract between individuals online, by providing a smart contract function based on a blockchain, it is possible to safely conduct transactions between individuals while protecting personal information.

Further, according to the present invention, by collecting similar information related to a personal IP registered in a server using a web crawling method and the like and determining whether the similar information infringes on the corresponding personal IP by comparing the collected similar information to the personal IP, when it is determined that the similar information infringes on the personal IP, the user of the terminal can be rapidly notified of the corresponding information, and thus the user can take an appropriate response to increase the user's satisfaction.

It will be understood that various modifications and alterations of the above-described contents may be made without departing from the spirit and scope of the present invention by those of skilled in the art to which the present invention belongs. Therefore, the exemplary embodiments disclosed above and in the accompanying drawings should be considered in a descriptive sense only and not for limiting the technological scope. The technological scope of the present invention is not limited by these embodiments or the accompanying drawings. The spirit and scope of the present invention should be interpreted by the appended claims and encompass all equivalents falling within the scope of the appended claims.

What is claimed is:

1. A personal intellectual property (IP) protection system comprising:
    a terminal configured to transmit, when the terminal performs an electronic contract function with another terminal for IP to which a user of the terminal has a right, an electronic contract generated in relation to electronic contract, IP information related to the generated electronic contract, and identification information of the terminal;
    a server configured to encrypt the electronic contract using a preset personal key and transmit the encrypted electronic contract, the IP information related to the electronic contract, and the identification information of the terminal to a blockchain server; and
    the blockchain server configured to register the encrypted electronic contract, the IP information related to the electronic contract, and the identification information of the terminal, which are transmitted from the server, in a blockchain in the blockchain server,
    wherein the server generates a random number code having a preset number of bits, apply the generated random number code to a preset hash function to generate a hash value, extracts a preset bit section from the generated hash value, apply the extracted bit section to another preset hash function to generate a personal key and an encryption key including a public key, and encrypts the electronic contract using the generated personal key, and
    the terminal is configured to publish a work produced by the user of the terminal and posts a license agreement for the published work through the server so that another user of the another terminal checks the license agreement for the work produced by the user, and the terminal interworks with the another terminal that checks the license agreement to proceed with the license agreement for the work produced by the user in a form of the electronic contract.

2. The personal IP protection system of claim 1, wherein the IP information includes at least one of a type of IP rights corresponding to the IP, file information related to the IP rights, a date of registration of the rights, and a name of a person having the rights.

3. The personal IP protection system of claim 1, wherein the blockchain server registers the encrypted electronic contract, the IP information related to the electronic contract, and the identification information of the terminal as a key value of a block related to the electronic contract in a blockchain.

4. The personal IP protection system of claim 1, wherein the server collects one or more pieces of similar information corresponding to the IP information from among a plurality of contents stored in a plurality of content management servers on the basis of the IP information using a crawling method and compares the IP information to the collected similar information to determine whether the collected similar information infringes on the IP information.

5. The personal IP protection system of claim 4, wherein, as a result of the determination, when it is determined that the collected similar information infringes on the IP information, the server relays the terminal and an external law firm server so that the terminal performs a legal service for IP information infringement.

6. A personal intellectual property (IP) protection method comprising:
    when a terminal performs an electronic contract function with another terminal for IP to which a user of the terminal has a right, transmitting, by the terminal, an electronic contract generated in relation to electronic contract, IP information related to the generated electronic contract, and identification information of the terminal to a server;
    encrypting, by the server, the electronic contract using a preset personal key;
    transmitting, by the server, the encrypted electronic contract, the IP information related to the electronic contract, and the identification information of the terminal to a blockchain server; and
    registering, by the blockchain server, the encrypted electronic contract, the IP information related to the electronic contract, and the identification information of the terminal, which are transmitted from the server, in a blockchain in the blockchain server,
    wherein the encrypting of the electronic contract using the preset personal key includes:

generating a random number code having a preset number of bits;

applying the generated random number code to a preset hash function to generate a hash value;

extracting a preset bit section from the generated hash value;

applying the extracted bit section to another preset hash function to generate a personal key and an encryption key including a public key; and encrypting the electronic contract using the generated personal key, and the terminal is configured to publish a work produced by the user of the terminal and posts a license agreement for the published work through the server so that another user of the another terminal checks the license agreement for the work produced by the user, and the terminal interworks with the another terminal that checks the license agreement to proceed with the license agreement for the work produced by the user in a form of the electronic contract.

7. The personal IP protection method of claim 6, wherein the encrypting of the electronic contract using the preset personal key includes:

identifying data not to be disclosed and data to be disclosed of the electronic contract;

encrypting the identified data not to be disclosed using a preset encryption method to generate encrypted data; and generating a partially encrypted electronic contract including the generated encrypted data and the identified data to be disclosed.

8. The personal IP protection method of claim 6, wherein the registering in the blockchain in the blockchain server includes registering the encrypted electronic contract, the IP information related to the electronic contract, and the identification information of the terminal as a key value of a block related to the electronic contract in the blockchain.

9. The personal IP protection method of claim 6, further comprising:

collecting, by the server, one or more pieces of similar information corresponding to the IP information from among a plurality of contents stored in a plurality of content management servers on the basis of the IP information using a crawling method;

comparing, by the server, the IP information to the collected similar information and determining whether the collected similar information infringes on the IP information; and as a result of the determination, when it is determined that the collected similar information infringes on the IP information, determining, by the server, that the collected similar information infringes on the IP information and relaying the terminal and an external law firm server so that the terminal performs a legal service for IP information infringement.

* * * * *